(12) United States Patent
Kim et al.

(10) Patent No.: US 10,874,986 B2
(45) Date of Patent: Dec. 29, 2020

(54) WATER PURIFIER

(71) Applicant: COWAY CO., LTD., Chungcheongnam-do (KR)

(72) Inventors: Jae-Hoon Kim, Seoul (KR); Young-Jae Lee, Seoul (KR); Su-Yong Park, Seoul (KR); Sang-Kyun Lee, Seoul (KR); Jung-Hun Lee, Seoul (KR); Hyun-Woo Lee, Seoul (KR); Ju-Hyuk Eom, Seoul (KR); Min-Sub Song, Seoul (KR); Sung-Han Yun, Seoul (KR); Dae-Sik Kang, Seoul (KR); Si-Jun Park, Seoul (KR)

(73) Assignee: Coway Co., Ltd

( * ) Notice: Subject to any disclaimer, the term of this patent is extended or adjusted under 35 U.S.C. 154(b) by 0 days.

(21) Appl. No.: 16/317,194

(22) PCT Filed: Jul. 4, 2017

(86) PCT No.: PCT/KR2017/007100
§ 371 (c)(1),
(2) Date: Jan. 11, 2019

(87) PCT Pub. No.: WO2018/012786
PCT Pub. Date: Jan. 18, 2018

(65) Prior Publication Data
US 2019/0299163 A1  Oct. 3, 2019

(30) Foreign Application Priority Data

Jul. 13, 2016 (KR) .................. 10-2016-0088559

(51) Int. Cl.
*B01D 61/12* (2006.01)
*B01D 61/02* (2006.01)
(Continued)

(52) U.S. Cl.
CPC .......... *B01D 61/12* (2013.01); *B01D 35/143* (2013.01); *B01D 35/157* (2013.01); *B01D 37/04* (2013.01);
(Continued)

(58) Field of Classification Search
CPC .......... B01D 2311/246; B01D 2313/18; B01D 35/143; B01D 35/157; B01D 37/04;
(Continued)

(56) References Cited

U.S. PATENT DOCUMENTS

| 2009/0173683 A1 | 7/2009 | Burrows |
| 2013/0146514 A1* | 6/2013 | Reeves ............... B01D 61/022 210/106 |

FOREIGN PATENT DOCUMENTS

| CA | 2 482 301 | 12/2002 |
| CN | 104528881 | 4/2015 |

(Continued)

OTHER PUBLICATIONS

PCT/ISA/210 Search Report issued on PCT/KR2017/007100 pp. 5.
(Continued)

*Primary Examiner* — Terry K Cecil
(74) *Attorney, Agent, or Firm* — The Farrell Law Firm, P.C.

(57) ABSTRACT

A water purifier comprising: a filter unit comprising at least one filter filtering water to generate purified water; a flow rate sensor measuring a flow rate of the water; a concentrated water channel discharging concentrated water, having been filtered by the filter unit; an extraction unit extracting the purified water; a flow rate control valve controlling a flow rate of purified water; an opening and closing degree measurement unit, measuring a degree of opening and closing of the flow rate control valve; a concentrated water ratio calculation unit, calculating a ratio between purified (Continued)

water and concentrated water, according to the degree of opening and closing of the flow rate control valve; and a controller, using the flow rate of water and the calculated ratio between purified water and concentrated water, to calculate amounts of water used, integrating the calculated amounts of water, and calculating a lifespan (remaining life) of the filter.

7 Claims, 3 Drawing Sheets

(51) Int. Cl.
    *B01D 61/08*      (2006.01)
    *C02F 1/44*      (2006.01)
    *B01D 37/04*      (2006.01)
    *B01D 35/157*      (2006.01)
    *B01D 35/143*      (2006.01)

(52) U.S. Cl.
    CPC ........... *B01D 61/02* (2013.01); *B01D 61/025* (2013.01); *B01D 61/08* (2013.01); *C02F 1/44* (2013.01); *C02F 1/441* (2013.01); *B01D 2311/246* (2013.01); *B01D 2313/18* (2013.01); *C02F 2201/005* (2013.01); *C02F 2209/05* (2013.01); *C02F 2209/40* (2013.01); *C02F 2209/445* (2013.01)

(58) Field of Classification Search
    CPC ...... B01D 61/02; B01D 61/025; B01D 61/08; B01D 61/12; C02F 1/44; C02F 1/441; C02F 2201/005; C02F 2209/05; C02F 2209/40; C02F 2209/445

See application file for complete search history.

(56) References Cited

FOREIGN PATENT DOCUMENTS

| | | |
|---|---|---|
| CN | 104941457 | 9/2015 |
| CN | 105311876 | 2/2016 |
| CN | 205182343 | 4/2016 |
| JP | 814419 | 1/1996 |
| KR | 2019870004936 | 4/1987 |
| KR | 1020030062838 | 7/2003 |
| KR | 1020040031967 | 4/2004 |
| KR | 200435538 | 1/2007 |
| KR | 100851616 | 8/2008 |
| KR | 10-0884643 | 2/2009 |

OTHER PUBLICATIONS

PCT/ISA/237 Written Opinion issued on PCT/KR2017/007100 pp. 5.

European Search Report dated Jun. 19, 2019 issued in counterpart application No. 17827860.2-1101, 7 pages.

Chinese Office Action dated Jul. 24, 2020 issued in counterpart application No. 201780043348.0, 6 pages.

* cited by examiner

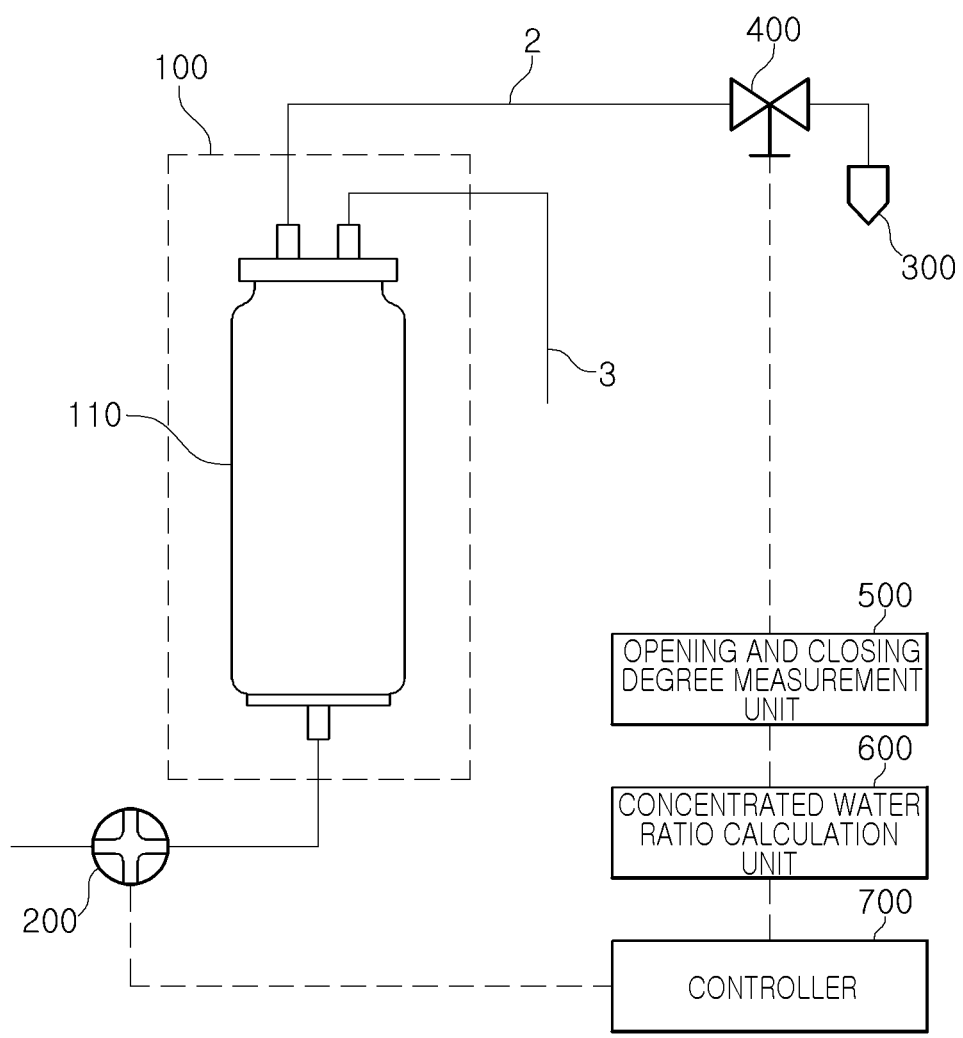
[FIG. 1]

[FIG. 2]
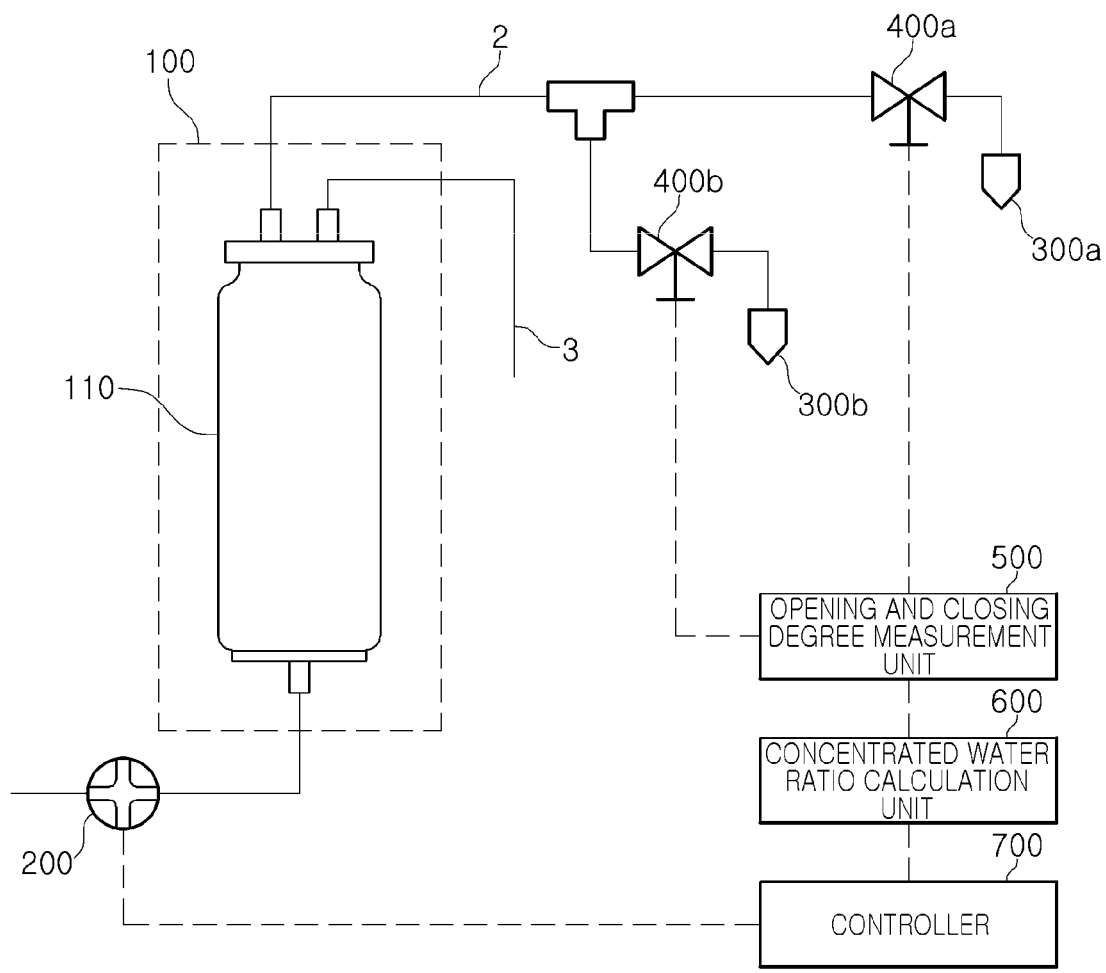

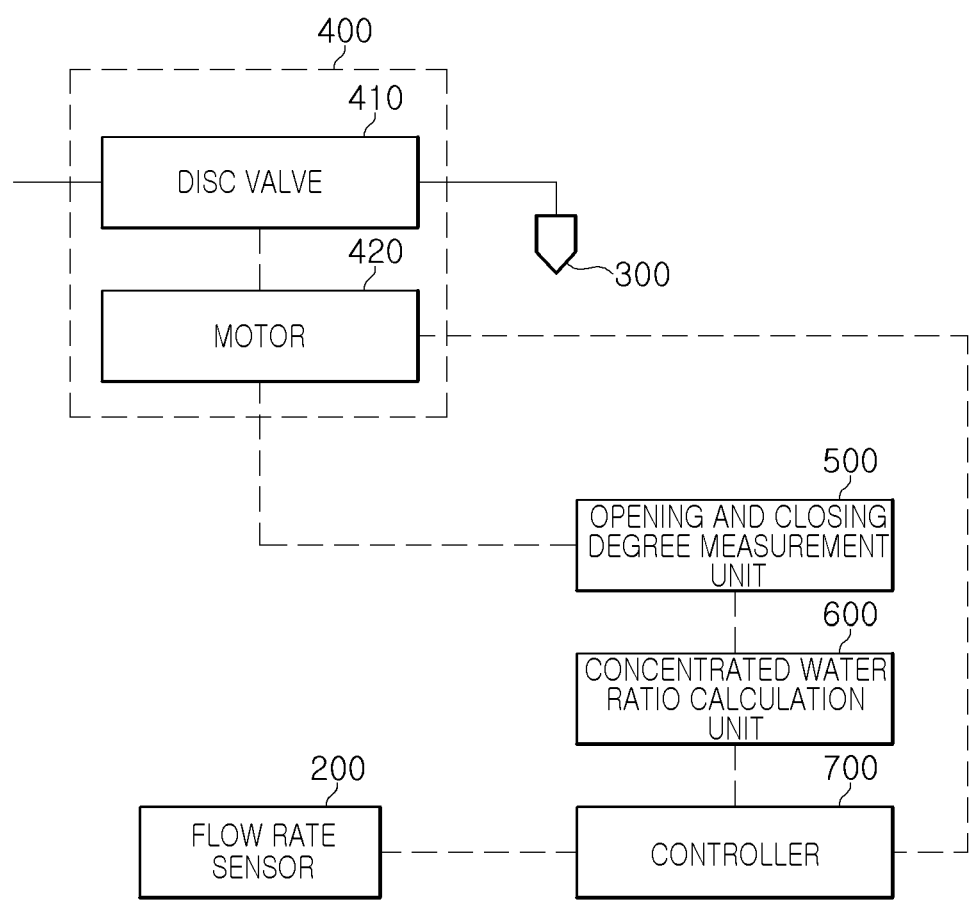

WATER PURIFIER

PRIORITY

This application is a National Phase Entry of International Application No. PCT/KR2017/007100, which was filed on Jul. 4, 2017, and claims priority to Korean Patent Application No. 10-2016-0088559, which was filed on Jul. 13, 2016, the content of each of which is incorporated herein by reference.

TECHNICAL FIELD

The present disclosure relates to a water purifier.

BACKGROUND ART

Basically, a filter used in a water purifier filters contaminants contained in water flowing into the water purifier. In this regard, since performance of the filter may deteriorate due to impregnation with the contaminants over time, the ability of the filter to remove contaminants may be reduced. Therefore, regular replacement of the filter is required.

When the water purifier includes a reverse osmosis membrane filter, water flowing into the filter passes through the filter to provide purified water, extracted through an extraction aperture, to a user, and concentrated water to be discharged through a drain. In order to accurately estimate a remaining life of the filter, it is necessary to measure amounts of purified water actually used by a user, that is, amounts of purified water extracted through the extraction aperture, and to integrate amounts of purified water extracted during a usage period of the water purifier.

A conventional water purifier estimates a remaining life of the filter by integrating actual usage time of the filter during a usage period of the water purifier or by integrating flow rates of water flowing into the filter.

However, since the above-described method does not reflect loss of flow rates of water, such as concentrated water, discharged through a drain, there is still a problem in which the estimated amount is different from amounts of purified water that are actually used.

In particular, in a case of having a plurality of water discharge apertures, since a ratio of concentrated water varies, depending on flow rates of water extracted through each of the water discharge apertures, and loss of the flow rates is not constant, it is difficult to estimate amounts of purified water actually used.

With respect to such problems, a method of measuring an actually used amount of purified water, by installing a flow rate sensor on a water discharge side, may be considered. However, it may be difficult to install a flow rate sensor on all water discharging sides, depending on the structural characteristics of the water purifier.

The following Patent Document 1 relates to a water purifier with a lifespan meter of a filter, but does not provide a solution to the above-mentioned problems.
(Patent Document 1) Korean Utility Model Publication No. 20-1987-0004936

DISCLOSURE

Technical Problem

The present disclosure has been made to solve the above problems of the prior art. An aspect of the present disclosure is to provide a water purifier, which may calculate a ratio of concentrated water in consideration of a degree of opening and closing of the flow rate control valve controlling a flow rate of purified water extracted through an extraction aperture, may estimate an actually used amount of purified water more accurately using the calculated ratio of concentrated water and a flow rate of flow into a filter unit, and may estimate a more precise time for replacement of the filter by using the same.

Technical Solution

According to an aspect of the present disclosure; a water purifier includes: a filter unit comprising at least one filter filtering water flowing into the filter unit to generate purified water; a flow rate sensor measuring a flow rate of the water flowing into the filter unit; a concentrated water channel discharging concentrated water, having been not filtered by the filter unit; an extraction unit comprising at least one purified water extraction aperture extracting the purified water; a flow rate control valve controlling a flow rate of purified water flowing into the purified water extraction aperture; an opening and closing degree measurement unit; measuring a degree of opening and closing of the flow rate control valve; a concentrated water ratio calculation unit, calculating a ratio between purified water and concentrated water, having been generated by the filter, according to the degree of opening and closing of the flow rate control valve; and a controller, using the flow rate of water measured by the flow rate sensor and the calculated ratio between purified water and concentrated water, to estimated amounts of purified water used, integrating the estimated amounts of purified water used during a usage period of the water purifier, and using the integrated amounts of purified water used to estimate a remaining life of the filter.

Advantageous Effects

According to an aspect of the present disclosure, effects in which may calculate a ratio of concentrated water in consideration of a degree of opening and closing of the flow rate control valve controlling a flow rate of purified water extracted through an extraction aperture, may estimate an actually used amount of purified water more accurately using the calculated ratio of concentrated water and a flow rate of flow into a filter unit, and may estimate a more precise time for replacement of the filter by using the same, may be provided.

DESCRIPTION OF DRAWINGS

FIG. 1 is a block diagram illustrating a water purifier according to an embodiment of the present disclosure;

FIG. 2 is a block diagram illustrating a water purifier according to another embodiment of the present disclosure; and FIG. 3 is a block diagram illustrating an embodiment of a flow rate control valve.

BEST MODE FOR INVENTION

Hereinafter, preferred embodiments of the present disclosure will be described with reference to the accompanying drawings.

However, embodiments of the present disclosure may be modified into various other embodiments, and the scope of the present disclosure is not limited to embodiments described below. Further, embodiments of the present disclosure are provided to more fully explain the present disclosure to those skilled in the art.

In the drawings referred to in the present disclosure, elements having substantially the same constructions and functions will be denoted by the same reference numerals, and the shapes and sizes of the elements, and the like, in the drawings may be exaggerated for clarity.

FIG. 1 is a block diagram illustrating a water purifier according to an embodiment of the present disclosure.

Referring to FIG. 1, a water purifier according to an embodiment of the present disclosure may include a filter unit 100, a flow rate sensor 200, an extraction unit 300, a flow rate control valve 400, an opening and closing degree measurement unit 500, a concentrated water ratio calculation unit 600, and a controller 700.

The filter unit 100 may include at least one filter 110 filtering water flowing from an external source to generate purified water. Here, the at least one filter 110 may be a reverse osmosis membrane filter. The filter 110 may be connected to a purified water channel 2 through which purified water generated in the filter 110 is discharged, and may be connected to a concentrated water channel 3 through which concentrated water not filtered by the filter 110 is discharged. Here, the concentrated water means water containing solid matter filtered by the filter 110, and may be discharged externally through the concentrated water channel 3.

In one embodiment, the filter unit 100 may include a sediment filter, a pre-carbon filter, a reverse osmosis membrane filter (or a hollow fiber membrane (ultrafiltration) filter), and a post-carbon filter. The type, number, and order of the filter may be changed, depending on a filtering method of the water purifier or a filtering performance required for the water purifier.

For example, a hollow fiber membrane filter may be provided instead of the reverse osmosis membrane filter. Such a hollow fiber membrane filter may be a porous filter having a pore size of several tens to several hundreds of nanometers (nm), and may remove contaminants in water through numerous micropores distributed on membrane surfaces thereof.

In addition, the post-carbon filter may not be provided. Alternatively, a microfilter MF or another functional filter may be provided in place of or in addition to the above-described filter.

The flow rate sensor 200 may sense a flow rate of water flowing into the filter 110. The flow rate sensor 200 may output the sensed flow rate value to the controller 700.

The extraction unit 300 may include at least one purified water extraction aperture extracting purified water generated by the filter unit 100. Here, in addition to the purified water extraction aperture, the extraction unit 300 may further include a hot water extraction aperture for extracting hot water, and a cold water extraction aperture for extracting cold water, in which the hot and cold water may be generated by using the purified water.

The flow rate control valve 400 may control a flow rate of the purified water flowing into the extraction unit 300. The flow rate control valve 400 may include a disc valve controlling a flow rate, depending on a degree of opening and closing according to a rotational position, and a motor rotating the disc valve.

This flow rate control valve 400 will be described in more detail below with reference to FIG. 3.

The opening and closing degree measurement unit 500 may measure a degree of opening and closing of the flow rate control valve 400. In one embodiment, the opening and closing degree measurement unit 500 may measure the degree of opening and closing by sensing an application time of a voltage to be applied or the number of pulses to be applied, to control the degree of opening and closing of the flow rate control valve 400. In another embodiment, the opening and closing degree measurement unit 500 may be a sensor directly sensing the position of the disc valve and measuring the degree of opening and closing.

The opening and closing degree measurement unit 500 will be described in more detail below with reference to FIG. 3.

The concentrated water ratio calculation unit 600 may calculate a ratio between purified water and concentrated water according to the measured degree of opening and closing of the flow rate control valve 400 by the opening and closing degree measurement unit 500. Here, the ratio between purified water and concentrated water may increase, as a degree of opening of the flow rate control valve 400 decreases.

In one embodiment, the concentrated water ratio calculation unit 600 may calculate a ratio between purified water and concentrated water by using a look-up table for the ratio of concentrated water, according to the degree of opening and closing of the flow rate control valve 400.

The controller 700 may use the calculated ratio between purified water and concentrated water by the concentrated water proportion calculating unit 600 and the measured flow rate of incoming water by the flow rate sensor 200, to estimate amounts of purified water used for estimation of a remaining life of the filter 110, e.g., to estimate amounts of purified water actually used. Also, the controller 700 may integrate the estimated amounts of purified water used during a usage period of the water purifier, and may use the integrated amounts of purified water used to estimate a remaining life of the filter.

In one embodiment, the controller 700 may include at least one processing unit and memory. The processing unit may include a central processing unit (CPU), a graphics processing unit (GPU), a microprocessor, an application specific integrated circuit (ASIC), a field programmable gate array (FPGA), and the like, and may have a plurality of cores. The memory may be a volatile memory, a non-volatile memory, or a combination thereof.

A concentrated water ratio calculation unit 600 may be included as a component, e.g., a portion, of a controller 700, according to an embodiment.

More specifically, a concentrated water ratio calculation unit 600 and a controller 700 may be configured as a one-chip processor. Further, a controller 700 may include a concentrated water ratio calculation unit 600. For example, a concentrated water ratio calculation unit 600 may be disposed as a component of a controller 700.

FIG. 2 is a block diagram illustrating a water purifier according to another embodiment of the present disclosure.

An embodiment illustrated in FIG. 2 is the same as the embodiment of FIG. 1 in view of a basic configuration, but is different from the later embodiment in view of the fact that the former embodiment may include a plurality of extraction apertures and flow rate control valves such that purified water generated by a filter unit 100 may be extracted through the plurality of extraction apertures.

When a plurality of extraction apertures 300a and 300b are connected to a filter unit 100, there may be a problem in which it is difficult to measure an actually used amount of purified water for measuring a lifespan of the filter 110 only with a flow rate sensor 200 measuring a flow rate of water flowing into the filter 110, because ratios of concentrated water to purified water according to degrees of opening and closing of flow rate control valves 400a and 400b controlling flow rates of the extraction apertures 300a and 300b are different from each other.

To solve this problem, a water purifier according to another embodiment of the present disclosure may measure a degree of opening and closing of flow rate control valves 400a and 400b controlling flow rates of a plurality of extraction apertures 300a and 300b, respectively, may use the measurement to calculate a ratio of concentrated water to purified water, may measure amounts of purified water used on the basis of the calculated ratio of concentrated water and the flow rate of water measured by the flow rate sensor 200, and may integrate the amounts of purified water used during a usage period of the water purifier to estimate a remaining life of the filter.

For example, when purified water is extracted through the first extraction aperture 300a, the opening and closing degree measurement unit 500 may measure a degree of opening and closing of the first flow rate control valve 400a, and the concentrated water ratio calculation unit 600 may calculate a ratio between purified water and concentrated water according to the degree of opening and closing of the first flow rate control valve 400a. Here, the controller 700 may measure an actually used amount of purified water extracted through the first extraction aperture 300a, by using the measured flow rate by the flow rate sensor 200 and the ratio between purified water and concentrated water according to the degree of opening and closing of the first flow rate control valve 400a.

Further, when purified water is extracted through the second extraction aperture 300b, similarly to the case in which purified water is extracted through the first extraction aperture 300a, the opening and closing degree measurement unit 500 may measure a degree of opening and closing of the second flow rate control valve 400b, and the concentrated water ratio calculation unit 600 may calculate a ratio between purified water and concentrated water according to the degree of opening and closing of the second flow rate control valve 400b. Here, the controller 700 may measure an actually used amount of purified water extracted through the second extraction aperture 300b, by using the measured flow rate by the flow rate sensor 200 and the ratio between purified water and concentrated water according to the degree of opening and closing of the second flow rate control valve 400b.

As described above, when a plurality of extraction apertures 300a and 300b are connected to one filter unit 100, effects in which a water purifier according to another embodiment of the present disclosure may calculate a ratio of concentrated water in consideration of a degree of opening and closing of the flow rate control valve for each extraction aperture, may estimate an actually used amount of purified water more accurately using the calculated ratio of concentrated water and a flow rate of flow into a filter unit 100, and may estimate a more precise time for replacement of the filter by using the same, may be provided.

FIG. 3 is a block diagram illustrating an embodiment of a flow rate control valve.

Referring to FIG. 3, a flow rate control valve 400 according to an embodiment of the present disclosure may include a disc valve 410 and a motor 420.

The disc valve 410 may be rotated by the motor 420, and a degree of opening and closing may be controlled according to a rotational position of the disc valve 410.

The motor 420 may rotate the disc valve 410 according to a voltage applied by control of a controller 700. Here, an opening and closing degree measurement unit 500 may sense when a voltage is applied to the motor 420, and may sense where the rotational position of the disk valve 410 is, according to the sensed time.

In one embodiment, the motor 420 may be a stepping motor. In this case, the motor 420 may control the rotational position of the disc valve 410 according to the number of pulses applied by the controller 700. The opening and closing degree measurement unit 500 may sense the number of the pulses, and may sense the position of the disk valve 410 by using the number of the sensed pulses.

While exemplary embodiments have been shown and described above, it will be apparent to those skilled in the art that modifications and variations could be made without departing from the scope of the present disclosure as defined by the appended claims.

The invention claimed is:

1. A water purifier comprising:
   a filter unit comprising at least one filter filtering water flowing into the filter unit to generate purified water;
   a flow rate sensor measuring a flow rate of the water flowing into the filter unit;
   a concentrated water channel discharging concentrated water, which has not been filtered by the filter unit;
   an extraction unit comprising at least one purified water extraction aperture extracting the purified water;
   a flow rate control valve controlling a flow rate of purified water flowing into the purified water extraction aperture;
   an opening and closing degree measurement unit, measuring a degree of opening and closing of the flow rate control valve;
   a concentrated water ratio calculation unit, calculating a ratio between purified water and concentrated water, having been generated by the filter, according to the degree of opening and closing of the flow rate control valve; and
   a controller, using the flow rate of water measured by the flow rate sensor and the calculated ratio between purified water and concentrated water, to estimate amounts of purified water used, integrating the estimated amounts of purified water used during a usage period of the water purifier, and using the integrated amounts of purified water used to estimate a remaining life of the filter.

2. The water purifier according to claim 1, wherein the concentrated water ratio calculation unit calculates a ratio between purified water and concentrated water by using a look-up table for the ratio between purified water and concentrated water, according to the degree of opening and closing of the flow rate control valve.

3. The water purifier according to claim 1, wherein the flow rate control valve comprises:
   a disc valve controlling a degree of opening and closing according to a rotational position; and
   a motor rotating the disc valve according to an applied voltage.

4. The water purifier according to claim 3, wherein the opening and closing degree measurement unit senses a rotational position of the disk valve by using time in which a voltage is applied, and measures the degree of opening and closing according to the rotational position.

5. The water purifier according to claim 3, wherein the motor is a stepping motor.

6. The water purifier according to claim 5, wherein the opening and closing degree measurement unit senses a rotational position of the disk valve by using the number of pulses applied to the stepping motor, and measures the degree of opening and closing according to the rotational position.

7. The water purifier according to claim 1, wherein the filter is a reverse osmosis membrane filter.

\* \* \* \* \*